United States Patent [19]

Telles

[11] 4,264,084
[45] Apr. 28, 1981

[54] FOLD-UP CAMPER STEPS

[76] Inventor: Ambrosio V. Telles, 1129 N. Tornillo, Las Cruces, N. Mex. 88001

[21] Appl. No.: 54,964

[22] Filed: Jul. 3, 1979

Related U.S. Application Data

[63] Continuation-in-part of Ser. No. 884,011, Mar. 8, 1978, abandoned.

[51] Int. Cl.³ ............................................. B60R 3/02
[52] U.S. Cl. .................................. 280/166; 182/115; 296/162
[58] Field of Search ................ 280/166; 182/115, 116; 296/162

[56] References Cited

U.S. PATENT DOCUMENTS

| 3,370,865 | 2/1968 | Baldwin | 280/166 |
| 3,392,990 | 7/1968 | Wolf | 280/166 |
| 3,693,754 | 9/1972 | Butler | 182/115 |
| 3,912,298 | 10/1975 | Humphrey | 280/166 |
| 3,997,211 | 12/1976 | Graves | 182/115 |

Primary Examiner—Robert R. Song
Attorney, Agent, or Firm—Cushman, Darby & Cushman

[57] ABSTRACT

A fold-up step assembly adapted to be attached to the rear of a mobile vehicle having a rear door, such as a camper, including a preferably rectangular platform which may be pivotally mounted at one edge to the rear of a camper at the foot of the camper rear door, a rigid step structure pivotally mounted to another edge of the platform, the platform being foldable against the rear door of the camper and the steps foldable against the underside of the platform for storage. A latch assembly for holding the platform in a folded up position includes means for releasing the platform from inside the camper. Mounted beneath the steps is a second latch assembly which holds the step structure against the underside of the platform during storage and includes a release lever mechanism which may be pivoted to release the step structure so it may be swung free from the platform for use.

15 Claims, 10 Drawing Figures

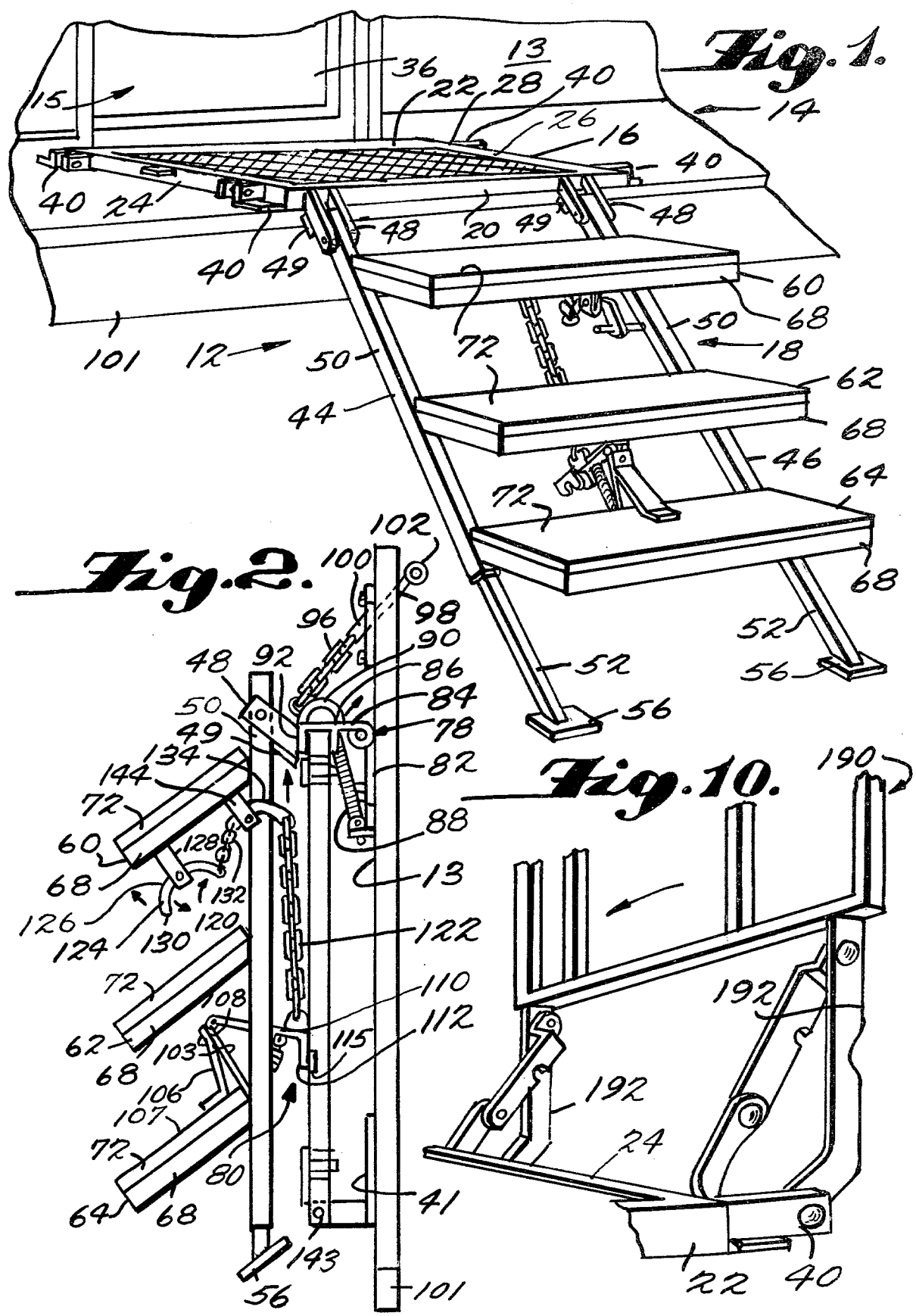

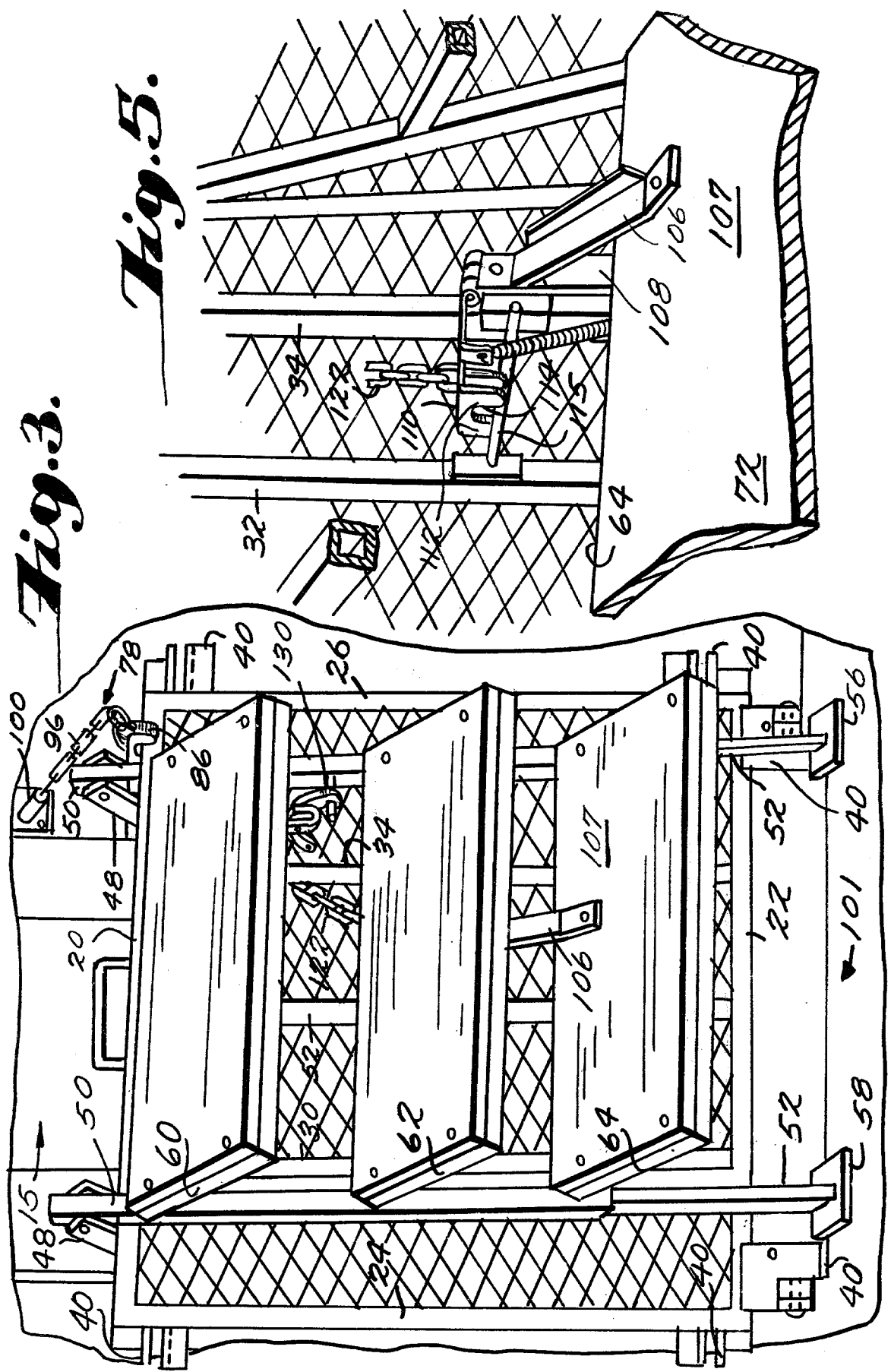

FOLD-UP CAMPER STEPS

BACKGROUND OF THE INVENTION

The present application is a continuation-in-part of application Ser. No. 884,011, filed Mar. 8, 1978 now abandoned.

The invention relates to accessories for recreational vehicles, and more particularly, to fold-up steps for campers, trailers and similar vehicles.

Rear doors of recreational vehicles are generally located high above the ground and require some form of steps for entering and exiting the camper therethrough. Fold-up steps hingedly mounted to the rear of the vehicle have been found to be particularly practical for the purpose, since they may be both conveniently stored and folded out for use at this location.

The nature of campers and their ordinary use result in a number of problems in the design of fold-up camper step assemblies. Since campers often travel on rough terrain and at high speeds, it is important that the step assembly be strong, constructed with a minimum of movable parts and be firmly secured to the camper when in its folded up state, in order to assure long life and avoid damage to both the camper and the step assembly. Since campers are often used for travel during which stops and use of the step assembly are frequent, it is important that the step assembly be capable of being safely, quickly and easily folded out for use, or folded up for travel. Another aspect of many fold-up camper step assemblies is that they fold-up against and block opening of the rear door from inside the camper. This is advantageous in one respect since it prevents an outwardly opening camper door from accidentally opening during vehicle motion. However, if the door must suddenly be opened from inside the camper in an emergency, such a fold-up step assembly could present a hazard.

Prior fold-up camper step assemblies do not overcome the problem discussed above. For example U.S. Pat. No. 3,997,211 issued to Graves discloses a patio and fold-up step assembly which is hingedly mounted to the rear of a recreational vehicle so that it may be opened adjacent to the front of the rear door and may be folded up against the back surface of the door and slid to the side of the door for storage while the vehicle is in motion. This assembly includes a rectangular platform which is slidably and pivotally mounted on an inside edge to the back of a camper. A step structure having a large number of hinged parts which can fold up flat is pivotally mounted to an outside edge of the platform. When the assembly is folded up the stair structure is flattened against the under surface of the platform. No integral means are provided for holding the folded-up assembly against the back of the camper nor is any means provided to keep the stair structure from pivoting upward and downward while the vehicle is in motion. As a result, motion of the vehicle on the highway or on rough terrain can cause vibration and pivotal motion of the assembly which can in turn result in damage or accelerated wear and tear to both the step assembly and the camper. The provision for sliding the folded-up assembly to the side of the door for storage increases the number of movable parts.

SUMMARY OF THE INVENTION

These and other problems with prior fold-up camper steps and platforms are overcome by the present invention. In accordance with the present invention, there is provided a fold-up step assembly adapted to be attached to the rear of a mobile vehicle having a rear door, such as a camper. The assembly includes a preferably rectangular platform which may be pivotally mounted to the rear of a camper at the foot of the camper rear door and a rigid step structure pivotally mounted to the outer edge of the platform. The platform and step structure may be folded upward into a vertical position for storage while the vehicle is in motion. A hooked lever or latch, mounted to the surface of the vehicle adjacent to the rear door, is adapted to grasp the outer edge of the platform to hold the assembly against the door. The lever is held in a grasping position by a spring which resists upward pivoting of the lever toward a vertical position. An elongated flexible member extends from the hooked end of the lever through a hole in the rear wall of the camper so that the hook may be released from inside the camper by simply pulling on the flexible member.

Mounted to the bottom sides of the steps is a latch assembly which holds the step structure vertically against the underside of the platform when the platform is in its folded up vertical position. The latch assembly includes an elongated member fixed in a transverse direction to the bottom surface of the platform, a stabilizer lever mounted to a lower one of the steps which can engage the transverse member when the step assembly is folded up, and a release lever mechanism mounted to an upper one of the steps and coupled to the stabilizer lever. The release lever mechanism includes a handle which may be pivoted to cause the stabilizer lever to release from the transverse member so that the step structure may be swung free from the platform when it is desired to pivot the step structure down into its functional position. The platform may also be mounted to the camper so that the step structure folds out sideways to the rear of the camper. When so mounted to the camper, a pair of removable vertical legs are mounted beneath the platform to provide additional support, and a hand railing is hingedly mounted to the outer edge of the platform such that it may be folded down onto the top surface of the platform when the assembly is in its folded up position.

Thus, the present invention has several advantages over prior fold-up camper step assemblies such as the Graves assembly described above. The present step assembly has only seven hinged parts and has only two relatively large rigid parts both of which may be held securely against the back door of the camper as opposed to at least 19 such parts in the Graves assembly. The assembly may be quickly and easily folded up or folded out in about 6 seconds. Furthermore, the assembly prevents accidental opening of the rear door of the camper from the inside but permits the platform to be easily released from its vertical position from inside the camper by simply pulling on a cord or wire.

BRIEF DESCRIPTION OF THE DRAWINGS

These and other details and advantages of the invention will best be understood from the following description of the preferred embodiment of the invention when read with reference to the accompanying drawings in which:

FIG. 1 is a perspective view of the preferred embodiment of the step assembly of the present invention mounted to the rear of a camper vehicle in a folded down position with the step structure directed away from the camper door and the optional gate and support legs removed.

FIG. 2 is a side elevation of the embodiment illustrated in FIG. 1 in the folded-up position.

FIG. 3 is a frontal perspective view of the embodiment shown in FIG. 2 in the folded-up position.

FIG. 5 is an enlarged detailed perspective of a portion latch mechanism of the embodiment shown in FIG. 1 with certain portions broken away for clarity.

FIG. 10 is an enlarged detailed perspective view of the gate shown in FIG. 8 and optionally mounted to the arrangement illustrated in FIG. 1.

DETAILED DESCRIPTION OF THE PREFERRED EMBODIMENT

Figure 6:
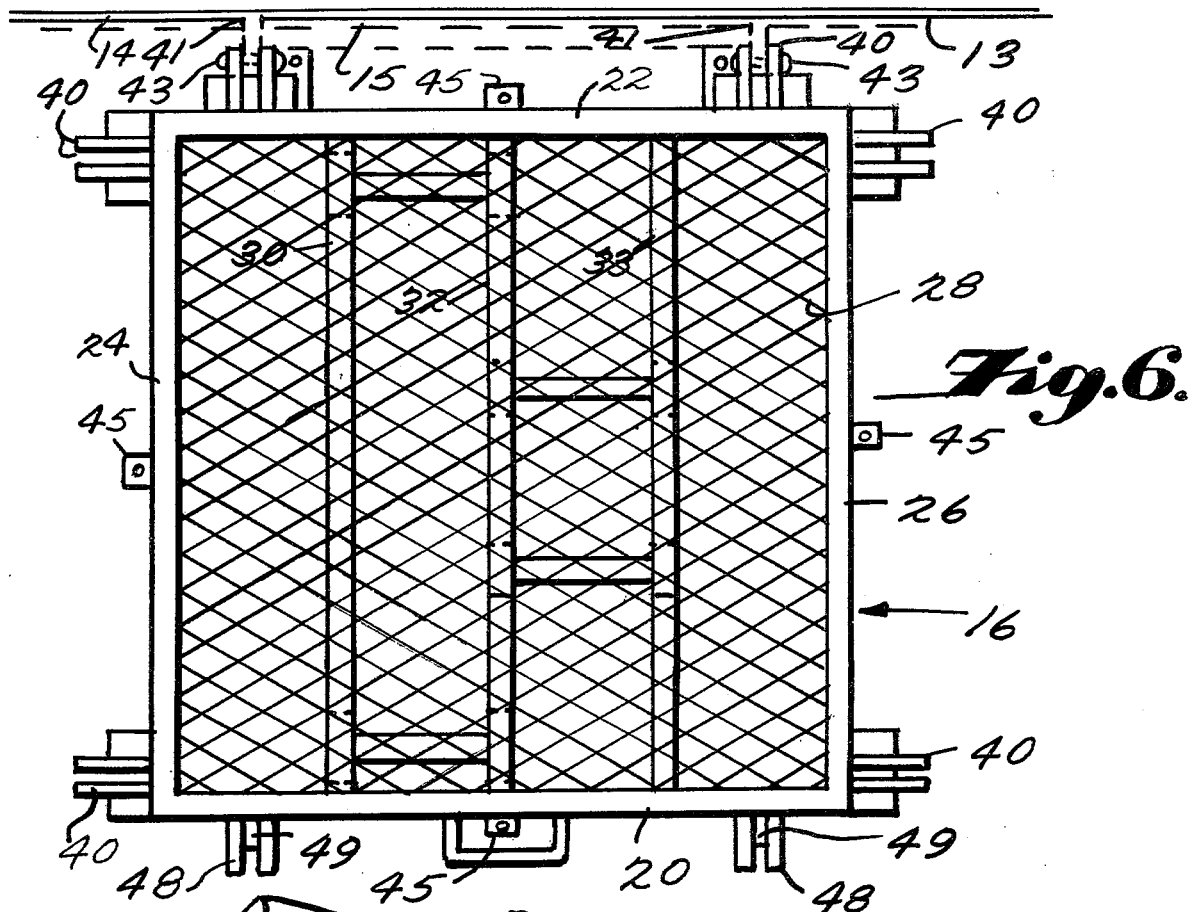
FIG. 6 is a plan view of the platform of the embodiment of the invention shown in FIG. 1.

Referring first to FIG. 1, there is shown a fold-up camper step assembly 12 attached to the rear surface 13 of a camper 14. Assembly 12 includes a rectangular platform 16 pivotally connected to camper 14 below its rear door 15 and step structure 18 pivotally mounted to an outside edge thereof as will be described. The step assembly may be suitably manufactured principally from steel and aluminum parts.

Step structure 18 includes a pair of spaced apart legs 44 and 46 pivotally connected at their upper ends to the outer surface of front frame member 20.

Legs 44 and 46 each include at their upper portions a tubular step bar 50, square in cross section in the example shown, which are pivotally connected at one end into a pair of lug brackets 48 which extends outwardly and downwardly from member 20 toward the surface of the earth at a 45° angle to the horizontal. Steel plates 49 extending across the under surfaces of each lug pair 48 limit the angle of the step bars 50 with respect to the perpendicular to no greater than 45° and thus assures that legs 44 and 46 provide rigid support for platform 16. The step bars 50 project angularly outwardly and downwardly from the front member 20 toward the surface of the earth and are connected in telescoping relation at their lower end to similarly shaped lower sections 52 which are received at their upper end portions by the depending end portion of step bars 50. Conventional means such as spring mounted movable pins (not shown) are provided to fix the step bars 50 and the lower leg portions 52 in a selected telescoped relation. At the bottom of lower leg portions 52 are feet members 56 swivelably mounted thereto so that a firm engagement with the ground may be obtained.

Three steps, respectively upper step 60, middle step 62 and lower step 64, each comprising coaxially a rectangular frame 68 of a selected width and length are rigidly mounted, as by welding, between step bars 50 in vertically spaced horizontal planes. Rectangular tread plates 72 are secured to each rectangular frame 68 to form the steps 60, 62 and 64.

Referring now to FIG. 6, a part between camper and porch of inland 4 way safety plate metal platform 16 includes elongated front and rear members 20 and 22 welded at their ends to elongated side members 24 and 26 to form a rectangular frame to which a strong metal mesh 28 is fixedly secured to form a strong non-slip surface. Rigidity is provided to the platform by cross members 30, 32 and 34 which extend between front member 20 and rear member 22. Fixedly mounted adjacent to the opposite ends of members 22, 24 and 26 are brackets 40 which may be alternatively utilized to hingedly fasten the platform 16 to the rear of camper 14 or to hingedly mount vertical support legs, or a handrail, as will be described. Platform 16 is pivotally mounted to the rear of camper 14 below the rear door 15 by "L" brackets 41 and a cooperating pivot pin 43. Tabs 45 at the midportions of the platform side members 22, 24 and 26 may be utilized in cooperation with a door stabilizer (not shown) mounted to the outside edge of the door so that the door may be held in an open position. Such a door stabilizer could hold the door open by a spring mounted rod extending downward along the outer edge 47 of the door 49 into a hole in the tab. (see FIG. 8.)

As indicated above, step assembly 12 may be folded up and locked against the camper rear surface 14, as is best illustrated in FIGS. 2 and 3. In the folded up position, platform 16 extends vertically upward from L bracket 41 parallel to the rear surface of camper 14, and step structure 18 extends vertically downward from pivot lug brackets 48. In order to lock the step structure and platform of the step assembly against rotation about their respective pivot points, upper latch apparatus 78 and step structure stabilizer latch assembly 80 are respectively provided. Referring to FIG. 2, upper latch apparatus 78 includes a mounting bracket 82, bolted to the rear surface 13 of the camper. Hingedly mounted to its top end of bracket 82 is an elongated lever 84 having spaced side lips 86 for engaging therebetween front platform member 20 so as to hold platform 16 in a vertical position. Connected between the bottom of bracket 82 and midpoint of lever 84 is a tension spring 88 which urges lever 84 downward to engage member 20. A handle 90 is mounted to the top of lever 84 for manually pivoting the lever upward as the platform is being pivoted to a vertical orientation. Lever 84 may then be lowered to lock the platform in its folded up vertical position as illustrated in FIGS. 2 and 3.

Referring to FIGS. 2 and 3, also provided with upper latch apparatus 78 are means for releasing latch 84 from platform 16 from the inside of the camper so that door 15 may be opened as for example in the event of an emergency. Mounted to handle 90 is a light chain 96 which is in turn attached to a wire 98, which extends through a tube 100 mounted to the rear surface 13 of the camper 14, and into the interior of the camper 14. A ring 102 is attached to the end of wire 98 which serves as a stopper. In the event that it is necessary to evacuate the camper through the rear door while the step assembly is in its folded up position, ring 102 may be pulled to cause the lever 84 to release platform 16 and step structure 18 from its vertical position. The step assembly will then rotate downward about pivot pin 43, the step structure stabilizer latch assembly 80 holding the step structure fixed parallel to platform 16. In many campers the rear bumper is vertically and horizontally positioned so that when the step assembly pivots downward, it will be supported in a horizontal position by feet 56 engaging the camper rear bumper 101. The camper door 15 may then be opened and a person may step out onto the platform 16. The step assembly may also be released from the vertical position from the outside of the camper by simply lifting upward on handle 90 in the same manner as was described with respect to locking the step assembly.

Figure 4:
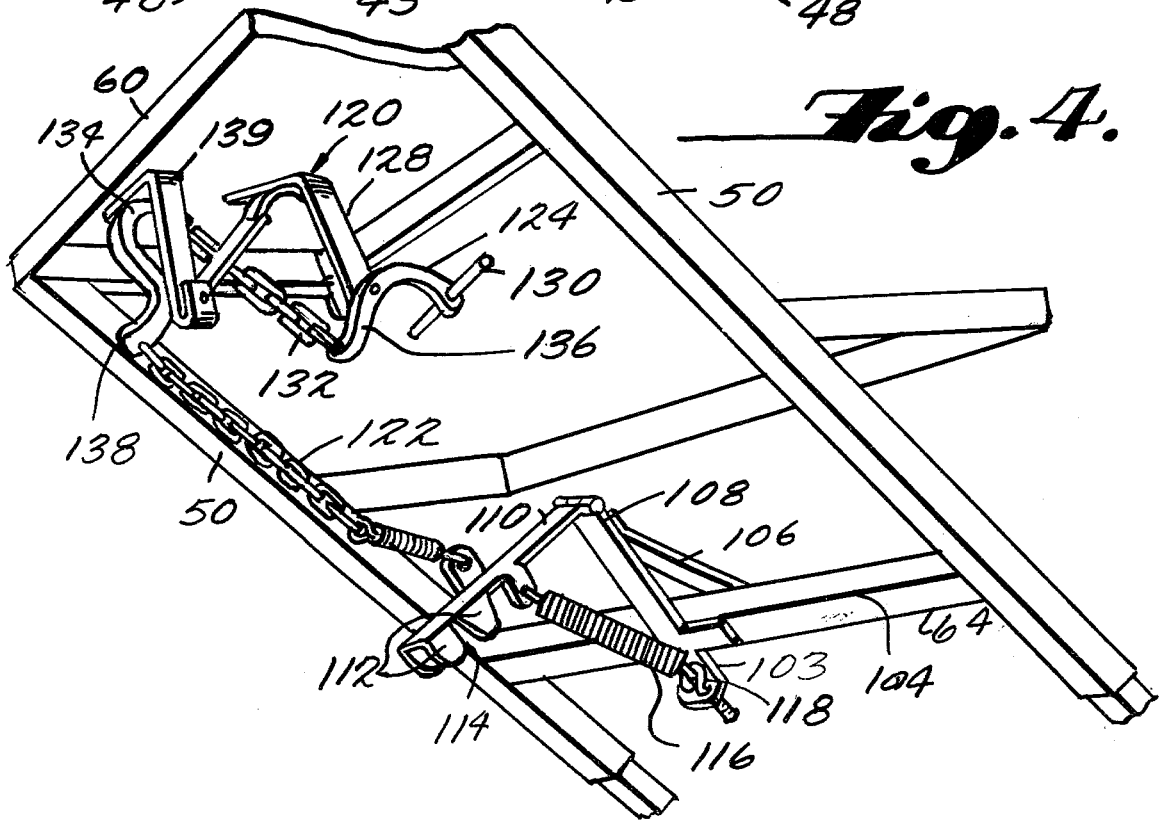
FIG. 4 is an enlarged detailed perspective of the step structure of the embodiment shown in FIG. 1 with certain portions broken away for clarity.

Step structure stabilizer latch assembly 80 may be best described with reference to FIGS. 2, 4 and 5. Assembly 80 includes a support bracket 103 mounted to the inside surface 104 of lower step 64. Bracket 103 is also secured to step 64 by bracket 106 which extends from the inside end 108 of bracket 103 to the top surface 107 of step 64. A latch arm 110 is hingedly mounted at one end to end 108 of bracket 103 and at its other end has parallel side lips 112 having a transversely directed slot 114 for engaging a stabilizer bar 115 mounted to the underside of platform 16 transversely to and between platform cross members 32 and 34. A tension spring 116 is secured between the opposite end 118 of bracket 103 and the central portion of latch arm 110 so as to urge latch arm 110 in a downward closing direction across stabilizer bar 115.

A latch release assembly 120 mounted to the undersurface of upper step 60 is coupled by a link chain 122 to the latch arm 110. Referring to FIG. 2, release assembly 120 includes a pivotable handle 124 which includes a U-shaped member 126 the base of which is pivotably mounted to support bracket 128 which is in turn fixedly mounted to the end surface of upper step 60. One end of U-shaped member 126 has fixed rigidly thereto a handle bar 130 extending perpendicular to the plane thereof and the other end of member 126 is coupled by a chain 132 to a second pivotable member 134. Handle bar 130 extends outwardly between steps 60 and 62 so that it is easily accessible for manual operation. As best illustrated in FIG. 4 member 134 has a substantially "S" shape, one end 134 being connected to chain 132 and the other end 138 being connected to chain 122. Member 134 is pivotally mounted at the peak of the bend in the "S" closest to end 138 to support bracket 139 which is securely mounted to the underside of step 60 directly behind bracket 126. Referring to FIGS. 2, 4 and 5, the various elements of release assembly 120 are shown to be arranged so that by pulling upward on handle 130, U-shaped member 126 is caused to rotate pulling downward on chain 132 which in turn causes "S" member 134 to rotate pulling upward on chain 122 to lift latch arm 110 upward off of stabilizer bar 115 thereby releasing step structure 18 from the locked position. It will be noted that the particular arrangement of release assembly 120 is for illustrative purposes only and that other pivotal arrangements for lifting a handle which in turn causes the latch lever to be released are also contemplated by the present invention. As is best illustrated in FIGS. 4 and 5 the side lips 112 of lever 110 may be suitably shaped with an inward slope so that when step assembly 18 is pushed inwardly toward the underside of platform 16 when the ladder is in its vertical position, the front surface of lips 112 will engage bar 115 lifting lips 112 sufficiently upward and extending spring 116 until the lever 110 snaps downward with bar 115 engaged in slot 114.

Figure 9:
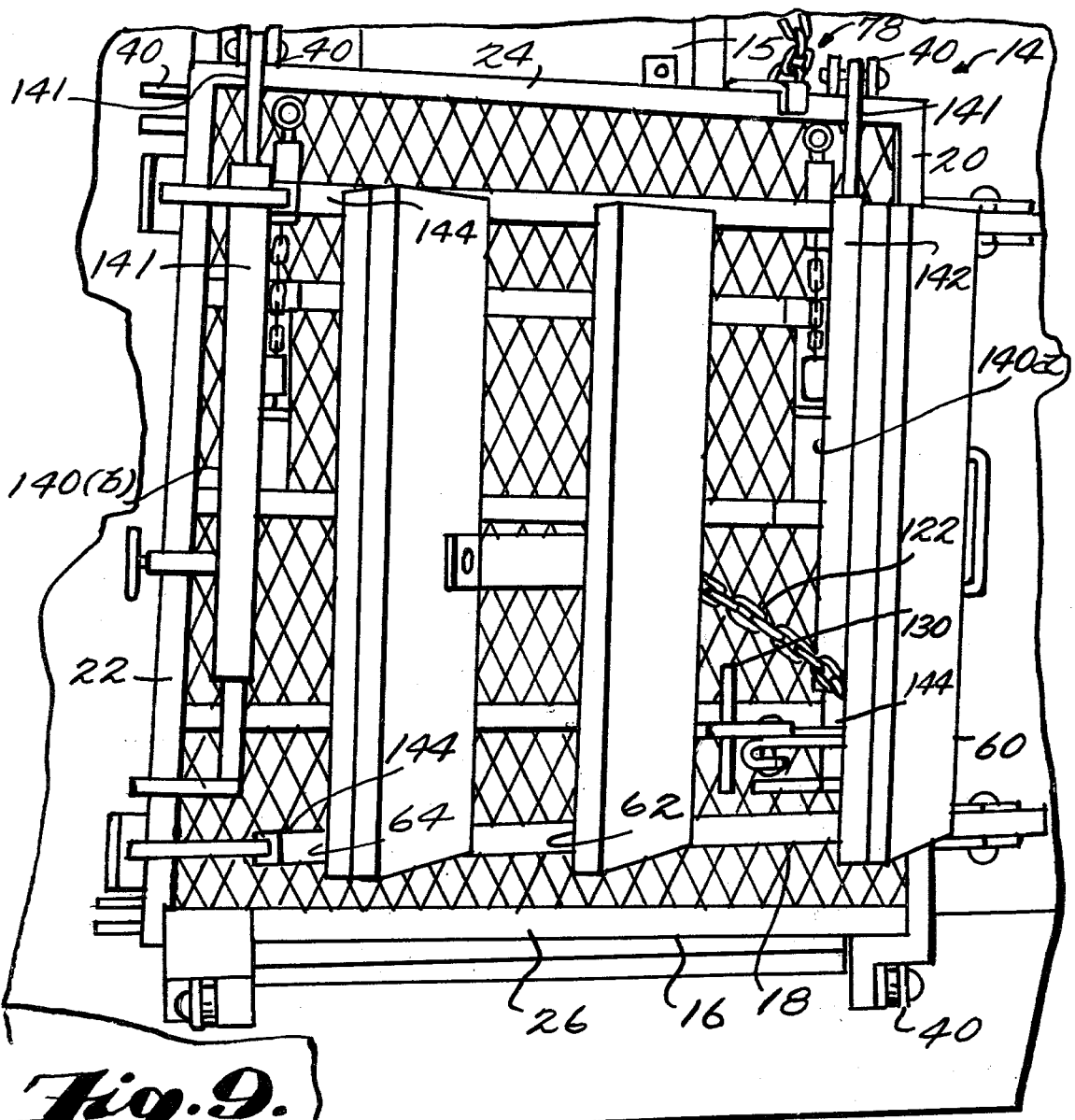
FIG. 9 is a front view of the arrangement of the invention shown in FIG. 8 in its folded up position.
Figure 8:
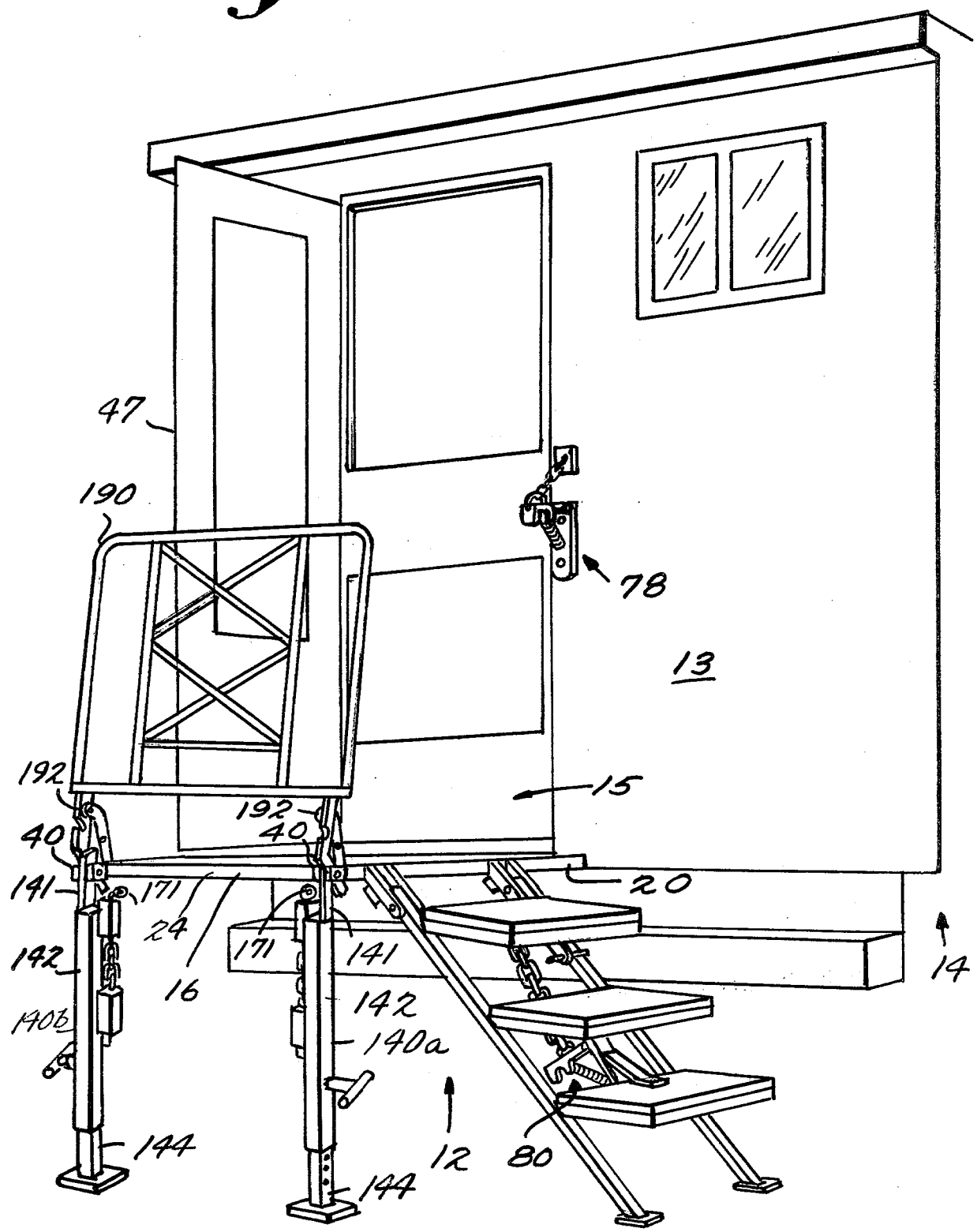
FIG. 8 is a perspective view of the invention mounted to the rear of a camper vehicle in its folded down position with the step structure directed to the side of the camper rear door.

In accordance with a second arrangement of the present invention which is best illustrated in FIGS. 8 and 9, platform 16 is pivotally mounted beneath door 15 along side platform frame member 26 so that step structure 18 folds down to the side of door 15 rather than outwardly therefrom. This may easily be accomplished since brackets 40 are substantially identically mounted to platform frame members 22, 24 and 26. It will be observed that when the step assembly is mounted to the rear surface 13 of the camper 14 with the step structure extendable to one side of door 15, as illustrated in FIGS. 8 and 9, the operation of the step structure stabilizer assembly 80 is identical to its operation in the alternate mounting and that the operation of the upper latch apparatus 78 differs only in that latch arm 84 locks onto platform side member 24 rather than onto member 20.

In the arrangement illustrated in FIG. 8, telescoping legs 140a and 140b are pivotally mounted by levers 141 to the bracket pairs 40 so that they may extend downward to the earth to provide support for platform 16 and may be pivoted to the under surface of platform 16 for storage when the step assembly is in its folded up position as will be described. Legs 140 each comprise an upper tubular section 142, square in cross section, of a selected length. A similarly shaped lower section 144 is telescopically received at its upper end portion by the depending portion of the upper leg section 142 and is maintained in a selected telescoped relation by a spring mounted rod which extends through the upper leg section 142 in a selected one of a plurality of transverse apertures formed in vertical spaced relation in the lower leg section 144. Swivelably feet, suitably flat plates 150 are swivelable mounted at the bottom of lower leg sections 142 so as to provide stable contact between the leg and the surface of the earth.

Figure 7:
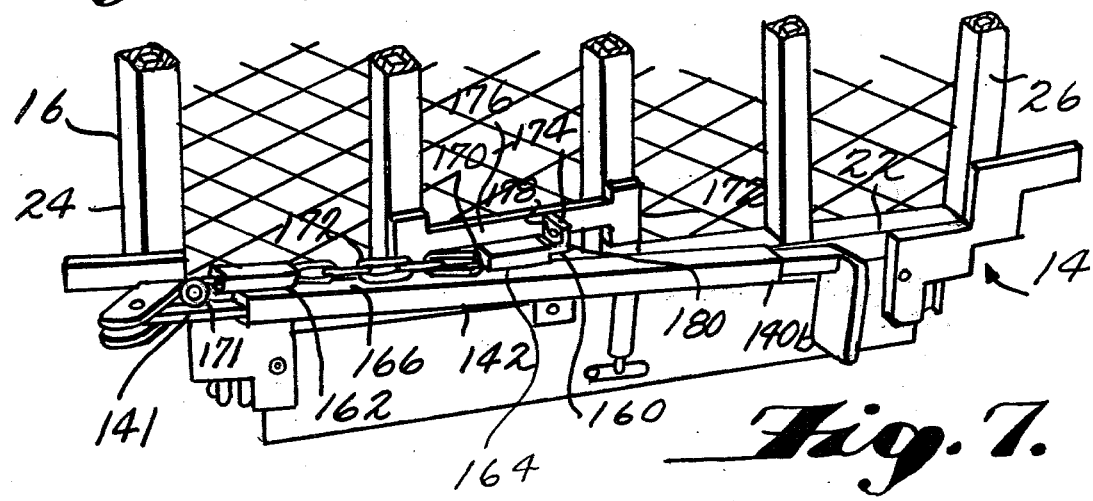
FIG. 7 is a detailed perspective view of one of the support legs folded in with the platform folded up of the embodiment shown in FIG. 1.

In accordance with the invention, there is also provided a leg storage locking arrangement whereby legs 140a and 140b may be pivoted against the under surface of platform 16 and securely locked thereagainst when the legs are not in use. FIGS. 7 and 9, respectively illustrate the manner of storing these legs when the assembly 12 is mounted to camper 14 along platform rear member 22 and platform side member 26. Referring to FIGS. 7 and 9, it is noted that in the embodiment shown lugs 40 must bend downward slightly to permit the legs to pivot beneath the platform. Alternatively, lever 141 may be bent outward similarly to handrail levers 192 shown in FIG. 8 and FIG. 10. Referring to FIG. 7, in accordance with this arrangement, a pair of box-shaped brackets 162 and 164 are fixed along the inside surface 166 of each upper leg section 142. A rod 168 is slidably spring mounted to bracket 164 through vertically longitudinally aligned apertures therein. End 170 of rod 168 is secured to one end of a light chain 172 which extends through bracket 162 and is fixed at its other end to a stop ring 171. A compression spring (not shown) is suitably mounted to rod 168 inside brackets 164 for urging rod 168 toward the depending end of upper leg section 142. As noted above, legs 140a and 140b may be mounted to platform 16 along any one of three platform support members 22, 24 or 26 and may be utilized whether the step assembly is arranged so that the step structure extends outwardly from or to the side of the rear camper door. FIG. 7 shows how leg 140b may be locked against the underside of platform 16. Mounted between cross braces 30 and 32 adjacent to folded upper leg section 142 is an elongated bracket 172. A tab 174 depends perpendicularly from the outer surface 176 of bracket 172. A hole 178 is drilled through tab 174 which may receive the tip 180 of rod 168. By pulling on ring 171 and aligning rod 168 with hole 178, tip 180 may be inserted therein, thereby locking leg 140b securely against the underside of platform 16. It will be appreciated however that either leg 140a or 140b may be secured in the same manner irrespective of the manner in which the step assembly is mounted to the rear of camper 14. The locking of legs 140a and 140b to the underside of platform 16 when the platform is mounted to the camper along platform side member 26 is illustrated in FIG. 9.

A handrail 190 is shown in FIG. 8 pivotally mounted between lug pairs 40 on front frame member 24 by levers 192. Handrail 190 includes conventional lever locking means such as is illustrated in detail in FIG. 10 which permit handrail 190 to be locked in an upright position or pivoted downward flush with the upper surface of platform 16. As indicated above, when the step assembly is mounted with step structure 18 extending outward from door 15 the railing is suitably mounted to either of platform side members 24 and 26.

Although only a preferred embodiment of the invention is disclosed in detail above, for illustrative purposes, it will be understood that variations and modifications of the disclosure which lie within the scope of the appended claims are fully contemplated. What is claimed is:

1. Fold-up camper step assembly for attachment to a vehicle wall comprising:
   a platform having a top side, an underside, at least two side edges including a first side edge and a second side edge, and means for pivotally attaching said first side edge to the vehicle wall;
   a step structure;
   means for pivotally attaching said step structure to said second side edge for movement between a first underside position wherein said step structure is disposed against the underside of said platform and a second position wherein said step structure extends from said another side edge for use;
   a step structure latching means, pivotally mounted on said step structure for movement between a first step structure latching position wherein said platform is engaged by said step structure latching means at said platform underside to hold said step structure at said first underside position and a second step structure released position wherein said step structure is free to pivot about said second side edge pivotally attaching means.

2. Fold-up camper steps as in claim 1 further comprising platform means engageable with said platform, for releasably holding said platform in said folded position.

3. Fold-up camper steps as in claim 2 wherein said platform engageable releasably holding means comprises platform latching means, mountable to said camper wall, for releasably engaging said platform at one of said at least two side edges other than said first side edge.

4. Fold-up camper step assembly as in claim 3 wherein said platform latching means further comprises means, actuable through said platform wall for communicating with said platform latching means to release said platform from said folded position.

5. Fold-up camper step assembly for attachment to a vehicle wall comprising:
   a platform having a top side, an underside and at least two edges including a first side edge and a second side edge, and means for pivotally attaching said first side edge to said vehicle wall;
   a step structure;
   means for pivotally attaching said step structure to said second side edge for movement between a first underside position wherein said step structure is disposed against the underside of said platform and a second position wherein said step structure extends from said second side edge for use;
   a platform latching means for mounting on the vehicle wall and movable between a first platform latching position wherein said platform is engaged and held in a folded position and a second platform released position wherein said platform is free to pivot about said first side edge pivotally attaching means, said platform latching means including a first latching lever having a pivot axis and having means for engaging and holding one of said at least two platform side edges other than said first platform side edge when said platform latching means is in said first latching position and said platform is in said holding position, and means actuable through said vehicle wall for pivoting said first latching lever to disengage said platform from said folded position.

6. Fold-up camper step assembly as in claim 5 wherein said pivoting means includes an elongated flexible element, attached at one end to said first latching lever at a position spaced from said pivot, and extendable through an opening in said vehicle wall at its other end inside said vehicle, so that said lever engaging and holding means are disengaged from said platform one side edge when said platform is in said folded position and said elongated flexible element is pulled at said other end.

7. Fold-up camper step assembly as in claim 5 further comprising another latching means, mounted to said step structure, and movable between a first step structure latching position wherein said step structure is engaged and held in said folded position and a second step structure released position wherein said step structure is free to pivot about said second side edge pivotally attaching means.

8. Fold-up camper step assembly as in claim 7 wherein said another latching means includes a second latching lever pivotally mounted to said step structure and including means for engaging and holding said platform at said platform underside when said step structure is in said first underside position and said another latching means is in said first step structure latching position so as to hold said step structure in said first underside position.

9. Fold-up camper step assembly as in claim 8 wherein said platform includes a latch bar disposed at said underside having a longitudinal axis parallel said first side edge, said latch bar being engaged and held by said second latching lever when said another latching means is in said first step structure latching position.

10. Fold-up camper step assembly as in claim 8 further comprising a release lever means, mounted to said step structure, for pivoting said second latching lever to disengage said platform therefrom, said release lever means including a release lever mechanism, said release lever mechanism including a handle pivotally mounted to said step structure for movement between a first position corresponding to said first step structure locking position and a second position corresponding to said second step structure release position and linkage means, said release lever mechanism coupling said second latching lever and said handle, for pivoting said second latching lever to move said another latching means from said first step structure latching position to said second step structure released position.

11. Fold-up camper steps as in claim 10 wherein said step structure includes a first step mounted to said step structure pivotally attaching means at a first fixed distance from said platform first side edge and a second step mounted to said step structure pivotally attaching means spaced from said first step at a second fixed distance from said platform first side edge, said second fixed distance being greater than said first fixed distance; said handle being pivotally mounted to said step structure at said first step and said second latching lever being pivotally mounted to said step structure at said second step, said handle extending outwardly between said first and second steps.

12. Fold-up camper steps as in claim 11 wherein said linkage means are pivotally mounted to said first step.

13. Fold-up camper step assembly as in claim 5 or claim 1 further comprising a handrail pivotally mounted to said platform, said handrail being collapsible onto the top side of said platform.

14. Fold-up camper step assembly as in claim 7 wherein said step structure includes first telescoping legs and having feet mounted to the bottoms thereof and being pivotally attached at the tops thereof to said step structure pivotally attaching means, said telescoping legs being extendable beneath said first side edge pivotally attaching means to support said platform when said platform is pivoted into horizontal orientation, said step structure is in said first underside position and said platform latching means is in said first step structure latching position.

15. Fold-up camper step assembly as in claim 5 or claim 7 or claim 1 wherein:
said platform is rectangular, said first side edge and said second side edge being in spaced parallel relation;
said platform having third and fourth edges respectively perpendicular to said first and second side edges;
said platform including means for pivotally attaching at least one of said third and fourth side edges to said vehicle wall;
said camper assembly further including a pair of collapsible auxiliary telescoping support legs removably mounted to said platform at one of said third and fourth side edges, each pivotable between first position extending perpendicular said platform underside and a second position collapsed against the underside of said platform; and means fixed to said collapsible legs for releasably fastening said collapsible legs against the underside of said platform when said collapsible legs are in said second collapsible leg position.

* * * * *